US 6,570,672 B1

(12) United States Patent
Hattori

(10) Patent No.: US 6,570,672 B1
(45) Date of Patent: May 27, 2003

(54) PRINTING SYSTEM AND METHOD

(75) Inventor: Hiroshi Hattori, Fuwa-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/536,689

(22) Filed: Mar. 28, 2000

(30) Foreign Application Priority Data

Mar. 31, 1999 (JP) ............................................ 11-094167

(51) Int. Cl.⁷ .............................................. G06F 15/00
(52) U.S. Cl. ........................ 358/1.2; 358/1.5; 358/1.9; 358/1.11; 358/1.13; 358/1.16; 358/501; 358/504; 358/401; 358/404; 358/406
(58) Field of Search ........................... 358/1.2, 1.5, 1.9, 358/1.11, 1.13, 1.16, 404, 401, 406, 501, 504, 523, 468, 444; 382/296–299

(56) References Cited

U.S. PATENT DOCUMENTS 5,521,715 A    5/1996   Verhaag et al. .............. 358/401
5,943,449 A *  8/1999   Yoshida ....................... 382/296

* cited by examiner

Primary Examiner—Mark Wallerson
Assistant Examiner—Twyler Lamb
(74) Attorney, Agent, or Firm—Oliff & Berridge, PLC

(57) ABSTRACT

A laser printer develops print data into first image data having a resolution of 1200×1200 dpi in the fine mode. Then, the laser printer breaks the first image data into blocks of two consecutive lines, retrieves image data A0, B0, A1, and B1 from the two consecutive lines of image data, and rearranges the retrieved image data alternately. As a result, two lines of image data are rearranged into one line of image data having a resolution of 2400×600 dpi. Based on the rearranged image data, the laser printer having an intrinsic resolution of 600×600 dpi executes printing while performing pulse width modulation of a laser beam. On the other hand, in the normal mode, the laser printer develops print data into second image data having a resolution of 600×600 dpi, and executes printing based on the second image data. Accordingly, the print mode can be changed appropriately between the fine mode and the normal mode. In the fine mode, the low-resolution laser printer can produce printouts that are perceived to be substantially the same as those produced by a high-resolution printer. In the normal mode, printouts are produced at a normal resolution.

17 Claims, 18 Drawing Sheets

C0 = A0 or B0
C1 = A0 and B0
C2 = A1 or B1
C3 = A1 and B1

C0 = A0 or A1 or B0 or B1
C1 = (A0 and A1) or (A0 and B0) or (A0 and B0) or
     (A1 and B1) or (B1 and B1)
C2 = (A0 and A1 and B0) or (A0 and A1 and B1) or
     (A0 and B0 and B1) or (A1 and B0 and B1)
C3 = A0 and A1 and B0 and B1

Fig. 17

PRINTING SYSTEM AND METHOD

BACKGROUND OF THE INVENTION

1. Field of Invention

The invention relates to a printing system and method and, more particularly, to a printing system and method allowing a low-resolution printer to perform printing based on print data prepared at high resolution.

2. Description of Related Art

Recently, printers have become increasingly higher in resolution, and laser printers capable of printing at a resolution as high as 1200×1200 dpi have become commercially available. In order to increase the resolution of a printer, it is required to increase a kind of response speed of the printer, for example, by adopting a photoconductive member responsive to a laser beam even when its irradiation time is short, by increasing the modulation frequency of the laser beam, or by speeding print data transmission to a laser beam drive circuit. Further, it is required to increase mechanical accuracy, for example, by increasing rotation accuracy of a laser scanner, which is crucial to formation of a latent image on a photoconductive member based on image data, by increasing rotation accuracy of the photoconductive member, or by increasing image development and transfer accuracy, which is crucial to development of a latent image with toner and transfer of a toner image to recording paper. Especially, when the circumference of the photoconductive member is less than the length of one page of printing paper, formation of a latent image, development of the latent image, and transfer of a developed image concurrently occur on the same photoconductive member. As a result, paper feed accuracy at the image transfer portion becomes a determinant of the overall accuracy of the printer.

As described above, since a laser printer attaining a high resolution of, for example, 1200×1200 dpi requires higher response speed and accuracy, such a printer becomes very expensive compared to a laser printer having a resolution of 600×600 dpi.

The maximum output speed, at which the printer resolution determined by the above-described mechanical accuracy is stably attained, is termed the process speed of the printer. For example, in the printer using a photoconductive member whose circumference is less than the paper length, the process speed is determined by the paper feed speed at the image transfer portion, and thus the paper feed speed is preset such that the printer can attain a specified resolution.

A direction along which a laser beam is scanned is termed herein a scanning direction, while a direction perpendicular to the scanning direction is termed a sub-scanning direction. The process speed is a speed pertinent to the sub-scanning direction.

Aiming at an increase in resolution, the response speed can be increased to some extent by making the process speed lower than its preset speed. Thus, the response speed will be excluded from the major factors limiting the resolution. However, in this case, the printing speed will be reduced instead. In addition, even when the process speed is reduced, limited mechanical accuracy, such as limited paper feed accuracy, is hard to resolve and directly defines the limitations of the printer. Increasing other mechanical accuracy, for example, by maintaining rotation accuracy of the laser beam scanner high enough to allow its high-speed rotation will result in a price increase. The laser beam scanner, if rotated at high speed, produces noise, and an additional measure is required to reduce the noise, resulting in a further price increase.

Under the above-described circumstances, demands for high-quality printouts at the lowest price are great. Also, there are demands for a laser printer that is even inexpensive and of low-resolution but capable of producing printouts using high-quality image data prepared for a high-resolution laser printer. Such a printer, if available, makes it unnecessary to prepare print data separately for resolutions varying from printer to printer.

SUMMARY OF THE INVENTION

In view of the foregoing, a first object of the invention is to provide a printing system and method that allow a low-resolution printer to produce printouts perceived to be comparable to those produced by a high-resolution printer. A second object of the invention is to provide a printing system and method in which printing is selectively performed at a high resolution and a normal resolution. A third object of the invention is to provide a printing system and method in which no displacements are produced in boundaries of a printed image.

To achieve the first and the second objects, a printing system according to one aspect of the invention includes a memory device that stores image data; a first developer that develops print data into first image data having a first resolution in two crosswise directions, the first image data being stored in the memory device; a rearranger that breaks the first image data stored in the memory device into blocks of N consecutive lines, N being not smaller than two, and retrieves therefrom the first image data in blocks of N consecutive lines to rearrange N lines of retrieved image data into one line of image data according to a predetermined rearrangement scheme; a printing device that prints at the second resolution lower than the first resolution; a first printing controller that controls the printing device to execute printing based on the image data rearranged by the rearranger; a second developer that develops print data into second image data having a second resolution in two crosswise directions, the second image data being stored in the memory device; a second printing controller that controls the printing device to execute printing based on the second image data stored in the memory device; and a switching device that switches between the first developer and the second developer prior to development of print data.

In the printing system as described above, the switching device switches between a fine mode and a normal mode when print data is stored in the memory device. In the fine mode, print data is developed into the first image data having the first resolution and stored in the memory device. On the other hand, in the normal mode, print data is developed into the second image data having the second resolution that agrees with the capability of the printing device, and is stored in the memory device.

In the fine mode, the first developer develops print data into the first image data having the first resolution in two crosswise directions. The first image data is stored in the memory device. Then the rearranger breaks the first image data into blocks of N consecutive lines (N being not smaller than two), retrieves the first image data in blocks of N consecutive lines from the memory device, and rearranges the retrieved image data according to a predetermined rearrangement scheme. Finally, the first printing controller controls the printing device to execute printing based on the image data rearranged by the rearranger.

On the other hand, in the normal mode, print data is developed into the second image data having the second resolution in two crosswise directions. The second image data is stored in the memory device. The second printing controller reads the second image data from the memory device and controls the printing device to execute printing based on the read image data, which is not rearranged by the rearranger.

Accordingly, in the fine mode, for example, image data having 2400×1200 dpi is produced based on the image data developed to have a first resolution of 1200×1200 dpi and stored in the memory device. Then, using a printer having a process speed of 600 dpi, such printouts can be produced that appear to be of high resolution and as if produced by a printer having a process speed of 1200 dpi.

On the other hand, on the normal mode, printing can be performed, for example, at a second resolution of 600 dpi.

According to another aspect of the invention, the printing system further includes a mode determiner that determines which mode is designated as a print mode, the fine mode in which printing is executed at the first resolution or the normal mode in which printing is executed at the second resolution. The switching device switches to the first developer when the mode determiner determines that the fine mode is designated, and switches to the second developer when the normal mode is designated.

Accordingly, the print mode can be selectively changed, according to the desired resolution, between the fine mode and the normal mode.

According to another aspect of the invention, the printing system further includes a memory amount determiner that determines whether an amount of memory of the memory device is sufficient to store print data as the first image data. The switching device switches to the first developer when the memory amount determiner determines that the amount of memory is sufficient, and switches to the second developer when the memory amount determiner determines that the amount of memory is insufficient.

With this arrangement, when print data is too large to be stored, as the first image data in the fine mode, in the memory device, the print mode can be changed to the normal mode in which the print data is stored as the second image data having the second resolution. Accordingly, even when the amount of memory is insufficient, printing can be executed at the second resolution that agrees with the printing device's intrinsic capability.

According to another aspect of the invention, the printing device has the second resolution as a resolution in a sub-scanning direction in which a printing medium is transported and a third resolution, which is higher than the first resolution, as a resolution in a scanning direction perpendicular to the sub-scanning direction.

With this arrangement, in the printing system, printing is executed at the second resolution lower than the first resolution in the sub-scanning direction, and at the third resolution higher than the first resolution in the scanning direction. For example, image data prepared at 1200×1200 dpi is converted into image data with 2400×600 dpi, and the image data is transmitted to the printing device, such as a laser printer, having a process speed of 600 dpi. Then, image data is outputted in the scanning direction by being converted at a modulation frequency that attains a resolution of 2400 dpi higher than 1200 dpi. As a result, characters and graphics printed on a printing medium appear comparable to those produced by a high-resolution laser printer having 1200× 1200 dpi.

According to still another aspect of the invention, the first resolution is N times the second resolution, and the third resolution is N times the first resolution.

With this arrangement, when the first resolution is used as the reference, the second resolution is 1/N times the first resolution and the third resolution is N times the first resolution. For example, provided that N=2 and the first image data is prepared at a first resolution of 1200×1200 dpi, the printing device executes printing at 1/2 times the first resolution in the sub-scanning direction and at 2 times the first resolution in the scanning direction. In other words, the printing device executes printing based on image data rearranged into 2400×600 dpi. An outputted image is isotropic and distortion-free, that is, it has the same length-to-width ratio as that of the image data prepared to have the first resolution.

According to still another aspect of the invention, the printing device comprises a print engine for a laser printer, and the first printing controller controls the print engine to perform pulse width modulation of a laser beam that is moved in the scanning direction when the printing device executes printing of one line of image data rearranged by the rearranger.

With this arrangement, an excellent gray-scale image can be easily produced.

According to still another aspect of the invention, the rearranger comprises an N-line memory device having a plurality of memory areas for storing N lines of retrieved image data line by line, and a selector that receives the image data on the basis of one bit, line by line, from the plurality of memory areas, rearranges the image data by means of an internal hardware logic circuit, and outputs the rearranged image data.

With this arrangement, the image data can be rearranged more quickly than when rearranged using software.

According to still another aspect of the invention, in accordance with the rearrangement scheme, image data located at same bit positions in respective lines of N lines is repeatedly processed into a bit cell composed of M bits (M being multiples of N) until one line of image data is created, the same bit positions in the respective lines corresponding, in a fixed relationship, to bit positions in the respective bit cells.

With this arrangement, in accordance with the rearrangement scheme, the rearranger repeatedly processes the image data located at same bit positions in respective lines of N lines (bitmapped data in the same column) into a bit cell composed of M bits (M=nN, n being a natural number) until one line of image data is created. The same bit positions in the respective lines correspond, in a fixed relationship, to bit positions in the respective bit cells. More specifically, when N=2, two consecutive lines of image data in the sub-scanning direction are retrieved from the first image data having the first resolution. According to a rearrangement scheme, the two consecutive lines of image data are broken into, for example, 2-bit cells. Then, bit data in the first line and bit data in the second line in each bit cell are rearranged alternately into image data in one-and-the same line. At this time, either the bit data in the first line or the bit data in the second line may be disposed at the first (leftmost) side in the line. According to an alternative rearrangement scheme, when N=2, two consecutive lines of image data in the sub-scanning direction are retrieved, and the two consecutive lines of image data are broken into bit cells, each being composed of 2×2=4 bits. Then, bit data in the first line and bit data in the second line in each bit cell are rearranged alternately into image data in one-and-the same line. Alternatively, when N=3, a bit cell composed of 3×3=9 bits may likewise be used to process image data.

To achieve the first and the third objects of the invention, a printing system according to one aspect of the invention includes a memory device that stores image data; a first developer that develops print data into first image data having a first resolution in two crosswise directions, the first image data being stored in the memory device; a rearranger that breaks the first image data stored in the memory device into blocks of N consecutive lines, N being not smaller than two, and retrieves therefrom the first image data in blocks of N consecutive lines to rearrange N lines of retrieved image data into one line of image data according to a predetermined rearrangement scheme; a printing device that prints at a second resolution lower than the first resolution; and a printing controller that controls the printing device to execute printing based on the image data rearranged by the rearranger. According to the rearrangement scheme, image data located at same bit positions in respective lines of N lines is repeatedly processed into a bit cell composed of M bits (M being multiples of N) until one line of image data is created, and when a bit of image data to be outputted exists at any one of the same bit positions in the respective lines, the bit of image data is disposed in a predetermined bit position in a corresponding bit cell.

In the printing system arranged as described above, in accordance with the rearrangement scheme, the rearranger repeatedly processes the image data located at same bit positions in respective lines of N lines (bitmapped data in the same column) into a bit cell composed of M bits (M=nN, n being a natural number) until one line of image data is created. In addition, when a bit of image data to be outputted (bitmapped data being ON, which indicates a black dot when image data is binary) exists at any one of the same bit positions in the respective lines, the bit of image data is disposed in a predetermined bit position in a corresponding bit cell. More specifically, when N=2, two consecutive lines of image data in the sub-scanning direction are retrieved from the first image data having the first resolution, and the two consecutive lines of image data are broken into bit cells, each being composed of, for example, 2×2=4 bits. For example, when, in a bit cell, bit data in the first line and in the first column, bit data in the first line and in the second column, and bit data in the second line and in the first column are OFF, and bit data in the second line and in the second column is ON, the bit data in the second line and in the second column is disposed at the first (leftmost) position of a new bit cell. In the printing system using such a rearrangement scheme, ON bit data is always disposed on the first (leftmost) side and, as a result, a printed image that has no displacements in boundaries and is perceived to be of high quality is obtained.

BRIEF DESCRIPTION OF THE DRAWINGS

A preferred embodiment of the invention will be described with reference to the following figures wherein:

FIG. 11 is a diagram showing a comparison between the printing results according to the first embodiment and those produced by a high-resolution printer;

FIG. 17 is a diagram showing an image data rearrangement scheme according to the fifth embodiment.

DETAILED DESCRIPTION OF PREFERRED EMBODIMENTS

A first embodiment of the invention as applied to a laser printer will now be described with reference to the accompanying drawings. The laser printer executes printing based on image data processed from print data transmitted from a personal computer by scanning a laser beam in the scanning direction.

Figure 1:
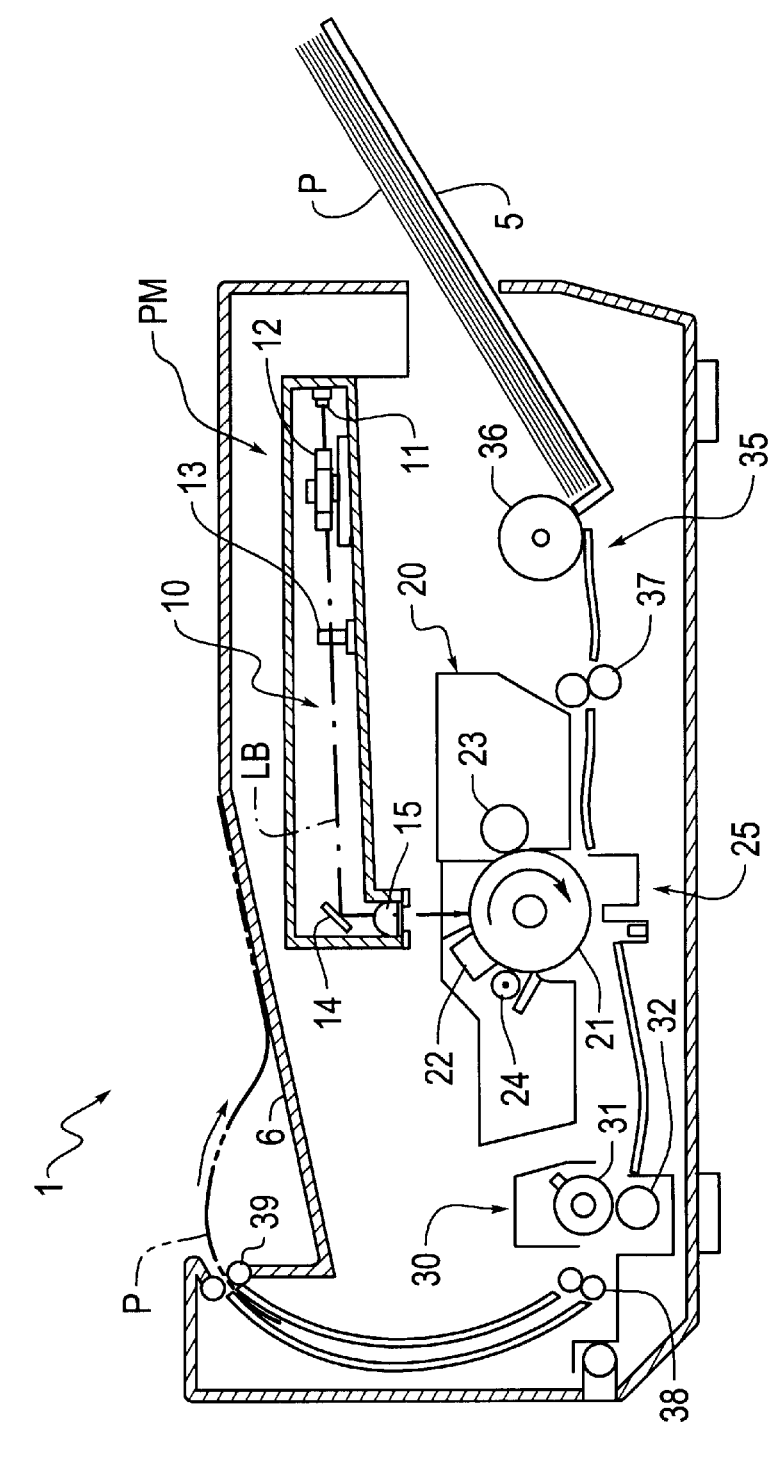
FIG. 1 is a schematic sectional view showing the structure of a laser printer according to a first embodiment of the invention.

Referring now to FIG. 1, a printing mechanism PM provided to a laser printer 1 will be briefly described. The laser printer 1 is provided with a laser scanner 10, a process cartridge 20, transfer/separation unit 25 comprising a transfer charger and a destaticizing needle, a fixing unit 30 comprising a fixing roller 31 and a pressure roller 32, a transport unit 35 comprising a paper feed roller 36, resist rollers 37, transport rollers 38, and discharge rollers 39.

The laser scanner 10 is provided with a semiconductor laser 11, a hexagonal mirror 12, a focus lens 13, a reflection mirror 14, and a synthetic resin lens member 15. The process cartridge 20 accommodates a photoconductive drum 21, a primary charger 22, a developing cylinder 23, and an exposure lamp 24. A laser beam LB incident on the hexagonal mirror 12 from the semiconductor laser 11 is deflected at predetermined angles by each mirror surface of the hexagonal mirror 12, which rotates at constant high speed, and scanned in the scanning direction over a predetermined range of angles. Then, the laser beam LB passes the focus lens 13 and is reflected downwardly by the reflection mirror 14 to pass the lens member 15. Finally, the rotating photoconductive drum 21 is irradiated with the laser beam LB and a static latent image is formed thereon. Image data with a resolution of 600 dpi (dots per inch) can be printed by means of the laser beam LB emitted from the semiconductor laser 11.

The static latent image formed on the photoconductive drum 21 is developed with toner supplied from the developing cylinder 23 into a visible image. The visible image is transferred onto recording paper P transported from a paper feed cassette 5 by the transport unit 35. The paper P on which the image is printed passes the fixing unit 30 and is transported to a paper discharge tray 6 by the transport rollers 38 and the discharge rollers 39.

Figure 2:
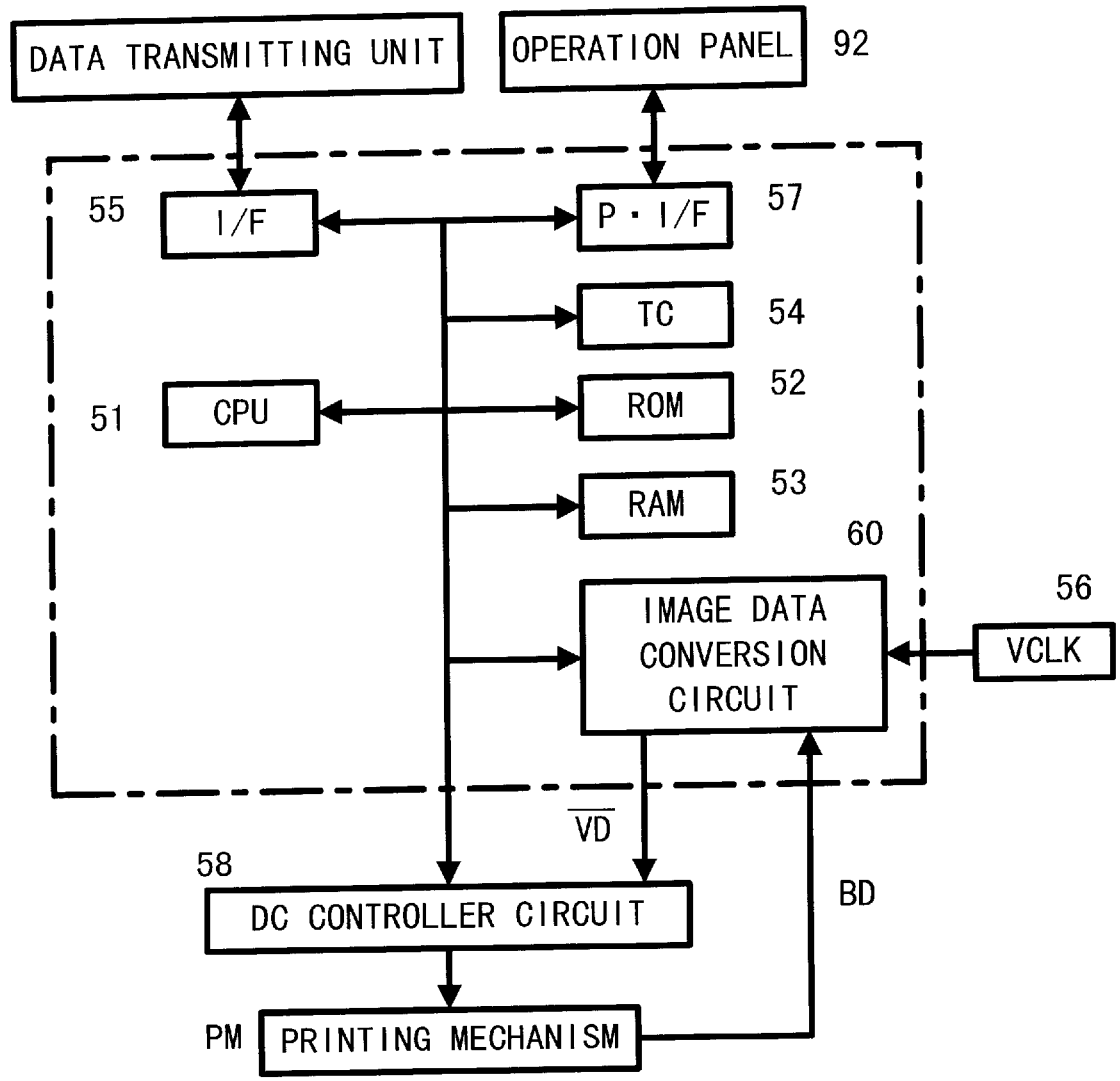
FIG. 2 is a block diagram showing the control system of the laser printer of FIG. 1.

Referring now to a block diagram shown in FIG. 2, a control system of the laser printer 1 will be described. As the control system of the laser printer 1 is basically the same as that of a typical laser printer, a detailed description will be omitted.

A video controller 50 of the laser printer 1 comprises a CPU 51, a ROM 52 storing various control programs, and a RAM 53 provided with various memories. The RAM 53 includes a reception buffer for receiving and storing image data transmitted from a data transmission unit 90, which is a personal computer or a host computer, and a dot image data memory for storing dot image data to be printed. The video controller 50 further comprises a timing clock generating circuit (TC) 54 for generating various timing signals, such as a printing clock signal PCLK, and clock pulses used for clocking, an interface (I/F) 55 for receiving print data transmitted from the data transmission unit 90, a panel interface (P-I/F) 57 for receiving signals from an operation panel 92, and an image data conversion circuit 60. The above-described components are all connected to the CPU 51 via signal lines 59 including a data bus control signal line.

Further, a video clock generating circuit VCLK 56 for generating a video clock signal VDCLK is connected to the image data conversion circuit 60. The video clock generating circuit 56 generates a timing clock signal corresponding to a resolution eight times as high as 600 dpi in the laser beam scanning direction. The timing clock signal is frequency-divided according to the target resolution and inputted as a clock pulse to the image data conversion circuit 60. Usually, in a 600 dpi mode, a period divided by eight timing clocks is allocated to a piece of image data (1 bit). Thus, by outputting a piece of image data, as a video signal, in synchronism with each of the eight timing clocks to be issued during that period, a resolution equivalent to 4800 dpi can be attained at the maximum.

The printing mechanism PM is provided with, as described above, the laser scanner 10, the process cartridge 20, the transfer/separation unit 25, the fixing unit 30, and the transport unit 35, and further provided with a main motor for driving the photoconductive drum 21 and the transport unit 35, a fixing heater for the fixing roller 31, and circuits for other electrical components. The DC controller circuit 58 is arranged to control the drive of the main motor, fixing heater, various circuits for electric components, as well as the semiconductor laser 11 and the scanner motor for driving the hexagonal mirror 12. A horizontal synchronous signal BD is outputted each time scanning is initiated by the laser scanner 10 and supplied to the image data conversion circuit 60.

Further, the DC controller circuit 58 turns ON/OFF (modulates) the laser beam based on the video signals outputted from the image data conversion circuit 60. A latent image with a certain resolution is formed on the photoconductive drum 21, which rotates at constant speed, by ON/OFF of the laser beam and rotation of the hexagonal mirror 12.

The above-described ROM 52 stores various control programs, which are commonly used in a typical laser printer, a processing program for developing print data into bitmapped image data, and a DMA (direct memory access) control program for controlling a DMA controller. The RAM 53 has various buffers for temporarily storing the results of calculations by the CPU 51 in addition to the reception buffer for storing received print data and the dot image data memory for storing dot image data used for printing.

Figure 3:
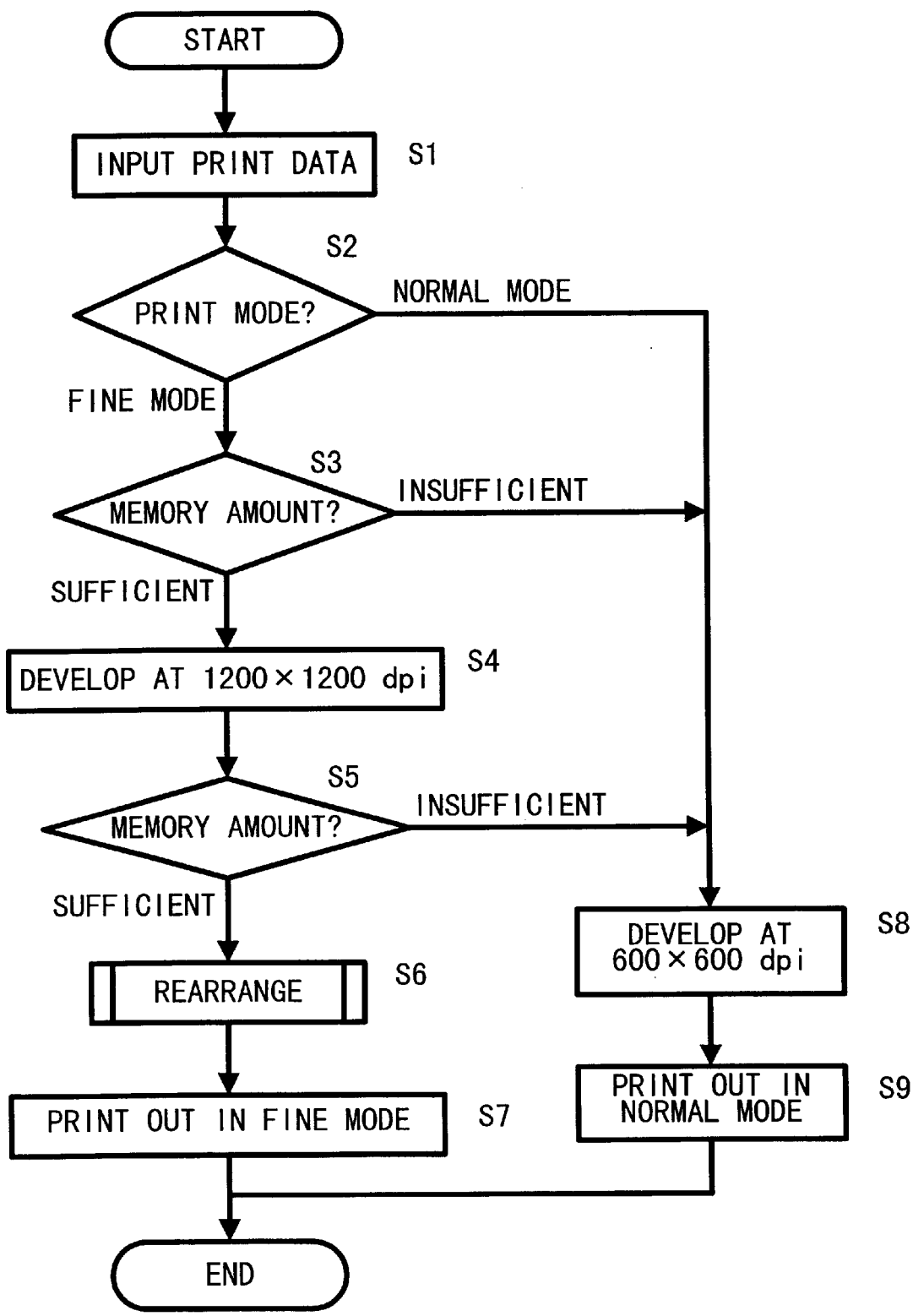
FIG. 3 is a flowchart showing the software-controlled processing according to the first embodiment.

Referring now to a flowchart shown in FIG. 3, processing performed by the CPU 51 of the laser beam printer according to the first embodiment will be described. As shown in FIG. 3, the CPU 51 executes print data input (S1). Specifically, the CPU 51 receives, from the personal computer or the like, print data described by a page-description language, such as PCL, a printer control command developed by the Hewlett-Packard or the PostScript language, developed by Adobe Systems, and stores the received print data into the reception buffer. The print data includes various control commands with which the processing mode and other settings of the laser printer can be changed.

Then, the CPU 51 determines whether the fine mode or the normal mode is designated as the print mode (S2). In this embodiment, a user is permitted to designate either of the fine mode used to produce printouts with a resolution equivalent to 1200×1200 dpi or the normal mode used to produce printouts with a normal resolution of 600×600 dpi. In order to designate the print mode, a mode designating command may be added to the input data, or the print mode may be designated from the operation panel of the laser printer 1. Alternatively, the print mode may be read from the NVRAM in which such designation is registered and retained after power is turned off.

When the fine mode is designated (S2: fine mode), the CPU 51 determines whether the amount of memory is sufficient or insufficient (S3). When print data is developed in the fine mode into image data, a sufficient amount of memory should remain to store image data with 1200×1200 dpi obtained as a result of the development. The CPU 51 makes this determination on the assumption that print data to be processed requires a normal amount of memory.

When the CPU 51 determines that the amount of memory is sufficient (S3: sufficient), it executes development of the print data received in step S1 into image data with 1200×1200 dpi (S4). In this embodiment, the print image is developed into one page of image data. Because a memory capable of developing one page of bit image at a time is costly, several (three or four) band memories may be prepared instead and used in sequence.

The CPU 51 determines again whether the amount of memory is sufficient or insufficient (S5). In the event of shortage of memory during development in the fine mode, development is discontinued and shifted into development in the normal mode.

When the CPU 51 determines again that the amount of memory is sufficient (S5: sufficient), it rearranges dot data of the developed image data with a high resolution of 1200×1200 dpi in blocks of plural consecutive lines, on the basis of, for example, a bit cell composed of 2×2=4 bits (S6). This process is accomplished when the CPU 51 outputs a command to a hardware logic circuit, which will be described later.

After that, the CPU 51 issues a command for printing in the fine mode based on the image data obtained as a result of the rearrangement (S7). When the image data with 1200×1200 dpi is rearranged into the image data with 2400×600 dpi, printing is executed by modulating the laser beam, based on the video signals inputted to the DC controller circuit 58, in pulse width at a modulation frequency corresponding to 2400 dpi in the scanning direction. It is noted that processing in S7 may be performed as successive processing from S6 without waiting for a separate command from the CPU 51.

On the other hand, when the normal mode is designated as the print mode (S2: normal mode) or when the CPU 51 determines that the amount of memory is insufficient in the fine mode (S3: insufficient, S5: insufficient), the CPU 51 develops the print data inputted in S1 into image data with a resolution of 600×600 dpi, which is the resolution attained in the normal mode (S8). When the CPU 51 determines that the print mode is the normal mode in S2 or that the amount of memory is insufficient in S3, the CPU 51 starts developing the image data with 600×600 dpi. On the other hand, when the CPU 51 determines that the amount of memory is insufficient in S5, image data developed at 1200×1200 dpi may be thinned out to image data with 600×600 dpi, or the print image inputted in S1 may be redeveloped into image data with 600×600 dpi.

When the print data is developed into image data with 600×600 dpi in S8, printing is executed by modulating the laser beam in pulse width at a modulation frequency corresponding to a resolution of 600×600 dpi, which is the normal resolution of the laser printer 1 according to the embodiment (S9).

When the CPU 51 determines that memory is insufficient in S5, the print data to be developed after this determination may be developed at 600×600 dpi, while the print data already developed at 1200×1200 dpi may be retained as it is. Then, the processing may go to, according to the image data retained in the memory medium, either rearrangement in S6 followed by printing in the fine mode in S7 or printing in the normal mode in S9.

If the print data is developed into bitmapped image data having a desired final resolution of 2400 dpi (in scanning direction)×600 dpi (in sub-scanning direction) in this embodiment, the above-described resolution conversion steps are not required. However, in conventional laser printers, development into bitmapped image data usually involves coordinate conversion including rotation of graphics data or copying of isotropic image data. Such development processes become very complicated if performed in the bitmap format where the resolution in the scanning direction is different from that in the sub-scanning direction. For this reason, when the fine mode is designated, as described above, the print data is intentionally developed into isotropic bitmapped image data (image data having equal resolutions in the scanning and sub-scanning directions) at a resolution higher than the intrinsic resolution of the laser printer, and then subjected to the above-described resolution conversion.

In this way, since the print mode is selectable between the fine mode and the normal mode, printouts can be produced at a desired resolution in response to the user needs. When the user selects the fine mode, print data provided by the personal computer or the like is developed into image data with a high-resolution of 1200×1200 dpi, rearranged into image data with a resolution of 2400×600 dpi in accordance with a predetermined rearrangement scheme. Then, printing is executed based on the rearranged image data while the laser beam is modulated in pulse width. Resultant printouts produced by the laser printer with a resolution of 600×600 dpi can be perceived as those produced by a printer with a high resolution of 1200×1200 dpi. Particularly, the printouts are comparable, in gray-scale representation, to those produced by the laser printer with 1200×1200 dpi.

As described above, print data prepared by application software or the like is developed, in one case, into isotropic image data with a resolution of 1200 dpi in the sub-scanning direction, which is twice as high as the intrinsic resolution in the sub-scanning direction of the laser printer, and a resolution of 1200 dpi in the scanning direction, which is equal to the resolution in the sub-scanning direction. In another case, print data is developed into isotropic image data with a resolution of 600 dpi in the sub-scanning direction, which is equal to the intrinsic resolution in the sub-scanning direction of the laser printer, and a resolution of 600 dpi in the scanning direction, which is equal to the resolution in the sub-scanning direction. Then, the image data developed as described above is stored in the dot image data memory of the RAM 53. In some cases, print data is transmitted as image data developed in a predetermined format or image data with 1200×1200 dpi for a high-resolution printer. In such cases, the image data is also stored in the dot image data memory.

The stored image data is transferred to the image data conversion circuit 60 by DMA (direct memory access) when the CPU 51 designates the address in the RAM 53 and the amount of data.

Figure 4:
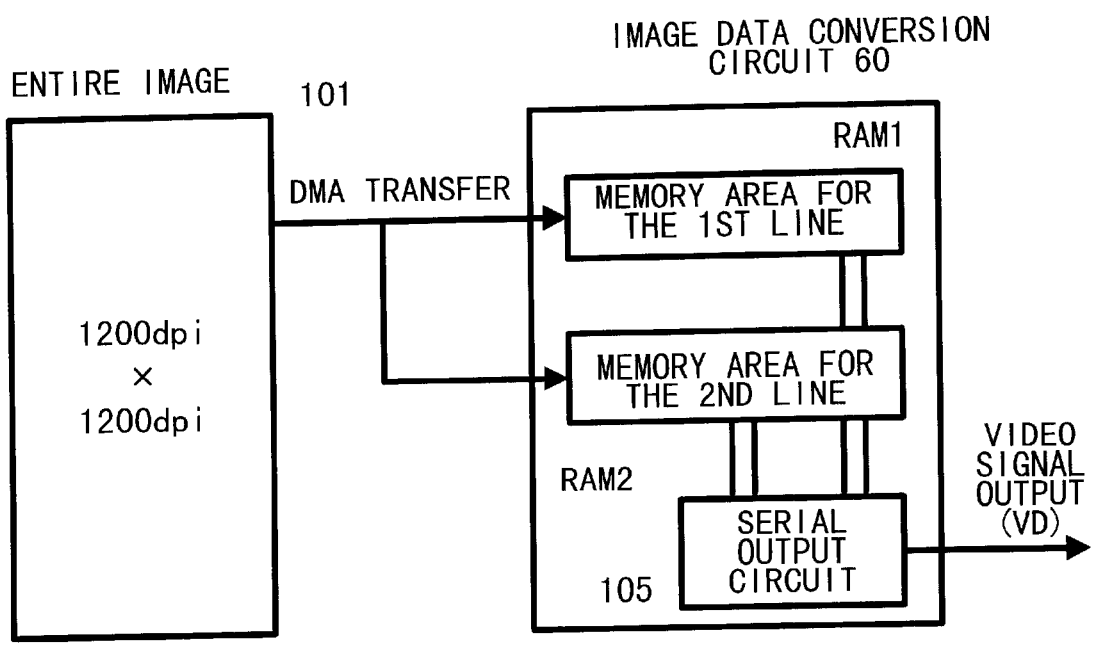
FIG. 4 is a block diagram showing that image data developed into 1200×1200 dpi is inputted to an image data conversion circuit, according to the first embodiment.

The image data conversion circuit 60 has separate memory areas RAM1 and RAM2. These memory areas respectively store one scanning line of image data transferred by DMA from the dot image data memory. FIG. 4 is a diagram showing that the image data 101 developed into 1200×1200 dpi is inputted to the image data conversion circuit 60. Transfer by DMA is repeated such that dots in an odd-numbered line of the image data 101 are stored in the first line memory area RAM 1, while dots in an even-numbered line of the image data 101 are stored in the second line memory area. In this way, dot data in two consecutive lines of the image data 101 developed into 1200×1200 dpi are stored in the RAM1 and RAM2. Then, the next two lines are read in synchronism with a BD signal, which indicates a single scan of a laser beam, repeatedly until the end of the page.

Figure 5:
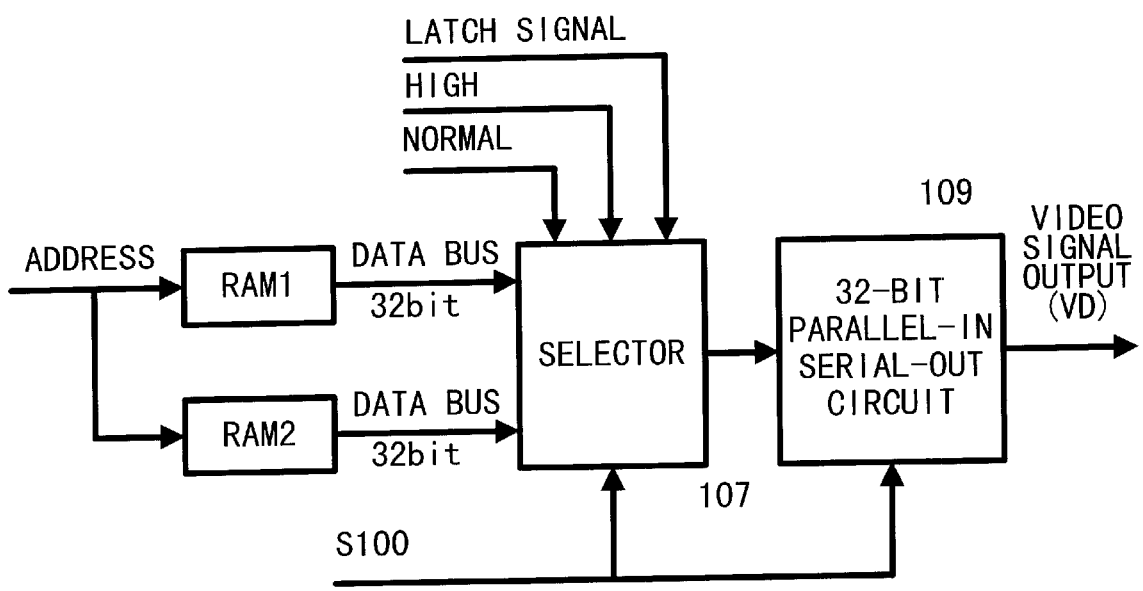
FIG. 5 is a block diagram showing a hardware logic circuit of the image data conversion circuit of FIG. 4.

After that, the serial output circuit 105 receives the image data rearranged by the hardware logic circuit, as described later, from the RAM1 and RAM2 and outputs the image data as serial data. The serial output circuit 105 will now be described in more detail with reference to FIG. 5, which shows a hardware logic circuit of the serial output circuit 105. The serial output circuit 105 comprises a selector 107 for receiving data from the RAM1 and RAM2, respectively, via a 32-bit data bus, and a 32-bit parallel-in serial-out circuit 109 for receiving 32-bit parallel data from the selector 107 and outputting video signals.

The selector 107 is arranged to receive a Normal signal that changes the image data conversion mode, a High signal that changes between upper/lower 16 bits of data to be processed, which will be described later, a latch signal, and a clock pulse. The normal signal being 0 indicates that the CPU 51 designates printing in the fine mode (2400×600 dpi), while the Normal signal being 1 indicates that the CPU 51 designates printing in the normal mode (600×600 dpi). When the Normal signal is 0 and the High signal is 1, the selector 107 is arranged to receive upper 16 bits of dot data from the image data stored in RAM1 and the RAM2, respectively, rearrange the received dot data in an alternate manner, and output the rearranged dot data to the parallel-in serial-out circuit 109. When the Normal signal is 0 and the High signal is 0, the selector 107 is arranged to receive lower 16 bits of dot data from the image data stored in RAM1 and the RAM2, respectively, rearrange the received dot data in an alternate manner, and output the rearranged dot data to the parallel-in serial-out circuit 109.

Figure 6:
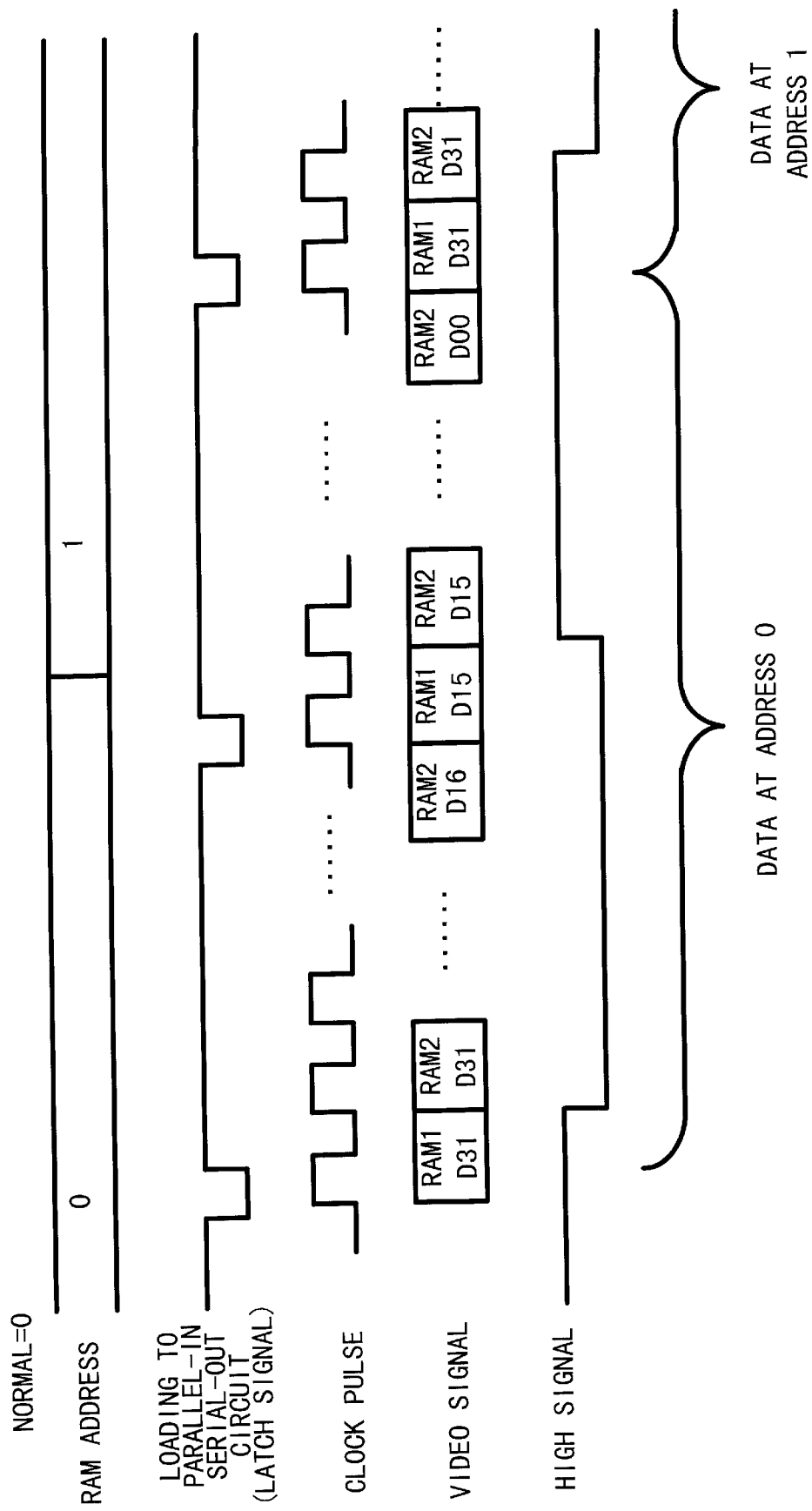
FIG. 6 is a timing chart showing rearrangement of image data according to the first embodiment.

The above-described processing is shown in the timing chart of FIG. 6. As shown in FIG. 6, the RAM address of the RAM1 and the RAM2 is incremented by 1 starting with 0 in synchronism with the rise of the High signal. In the parallel-in serial-out circuit 109, a latch signal is generated at a predetermined timing. According to the High signal value at the time of generation of a latch signal, the selector 107 receives and rearranges the upper or lower 16 bits of dot data from the RAM 1 and the RAM2, respectively, and serially outputs the rearranged dot data as the video signals.

More specifically, if a latch signal is generated in the parallel-in serial-out circuit 109 when the RAM address is 0, the High signal is initially 1, as shown in the FIG. 6. Thus, each time a clock pulse is generated, the selector 107 rearranges the upper 16 bits of data stored respectively in the RAM1 and the RAM2 sequentially and alternately in decreasing order from the uppermost bit. The uppermost bit data D31 in the RAM 1 is followed by the uppermost bit data D31 in the RAM2, the next bit data D30 in the RAM1, the next bit data D30 in the RAM2, . . . and finally, the 16th bit data D16 in the RAM2. 32-bit parallel data obtained in this way is inputted to the parallel-in serial-out circuit 109, which in turn outputs the 32-bit data as serial data.

When the next latch signal is generated in the parallel-in serial-out circuit 109 while the RAM address is 0, the High signal is 0 at this time, as shown in FIG. 6. Thus, each time a clock pulse is generated, the selector 107 rearranges the lower 16 bits of data stored respectively in the RAM1 and the RAM2 sequentially and alternately in decreasing order from the upper bit. The 17th bit data D15 in the RAM 1 is followed by the 17th bit data D15 in the RAM2, the 18th bit data D14 in the RAM1, . . . and finally, the lower most bit data D00 in the RAM2. 32-bit parallel data obtained in this way is inputted to the parallel-in serial-out circuit 109, which in turn outputs the 32-bit data as serial data.

The timing of generation of the latch signals is determined within a period of a single scan (which is defined between the BD signals) based on the scanning period allowing formation of an effective latent image on the photoconductive drum 21, the amount of image data to be processed during that scanning period, and the unitary processing amount of the image data conversion circuit 60. The clock pulses supplied to the image data conversion circuit 60 are, as described before, those generated by dividing the frequency of the timing clock signal from the video clock generating circuit 56 in accordance with the target resolution. The clock pulses correspond to the amount of data to be processed by a single scan and vary in periodicity depending on the target resolution. In this embodiment, the latch signals are generated once every 32 bits based on the clock pulses. In addition, the High signal is switched in synchronism with the latch signals.

Figure 7:
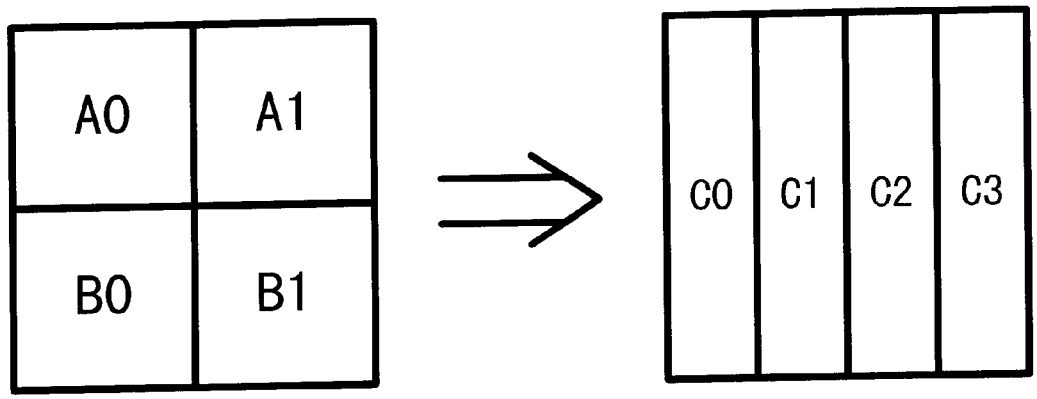
FIG. 7 is a diagram showing an image data rearrangement scheme on the basis of a bit cell composed of 2×2 bits according to the first embodiment.
Figure 8:
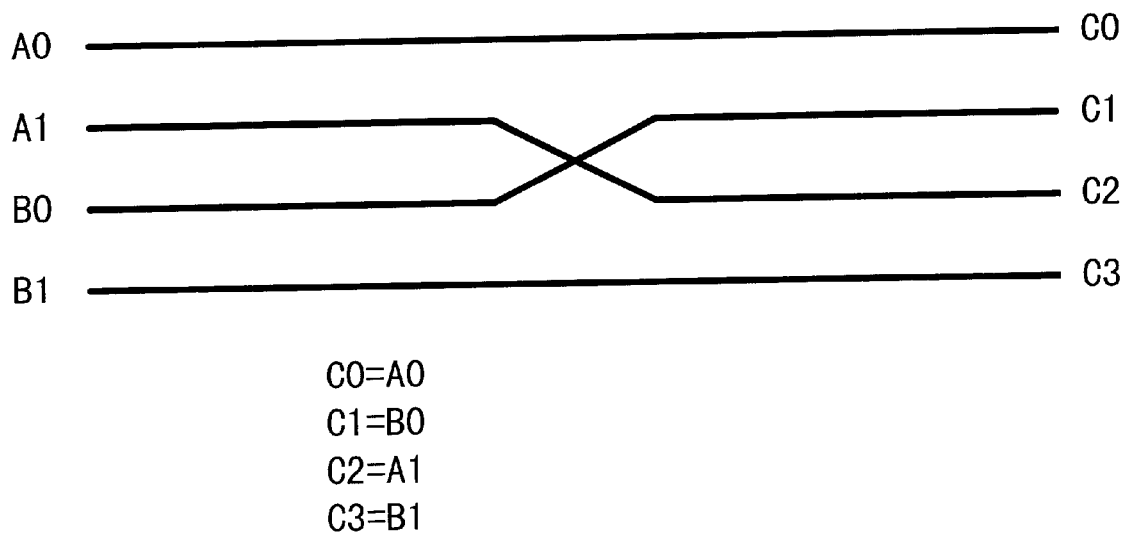
FIG. 8 is a connection diagram showing a selector circuit according to the first embodiment.

The rearrangement scheme will now be described. The following description is given on the assumption that, as shown in FIG. 7, A0 and A1 stored in the RAM1 as well as B0 and B1 stored in the RAM2 are rearranged into C0, C1, C2, and C3 by the selector 107 on the basis of a bit cell composed of 2×2 bits according to a predetermined scheme and then the rearranged data is outputted from the selector 107. The rearrangement shown in the above-described timing chart is realized by a hardware logic circuit. As the hardware logic circuit, connections in the internal circuit of the selector 107 are arranged as shown in FIG. 8. As is apparent from FIG. 8, dot data stored respectively in RAM1 and RAM2 is rearranged and outputted from the selector 107 alternately in the sequence of RAM1, RAM2, RAM1, RAM2 . . . , and in accordance with the scheme of C0=A0, C1=B0, C2=A1, and C3=B1.

Figure 9:
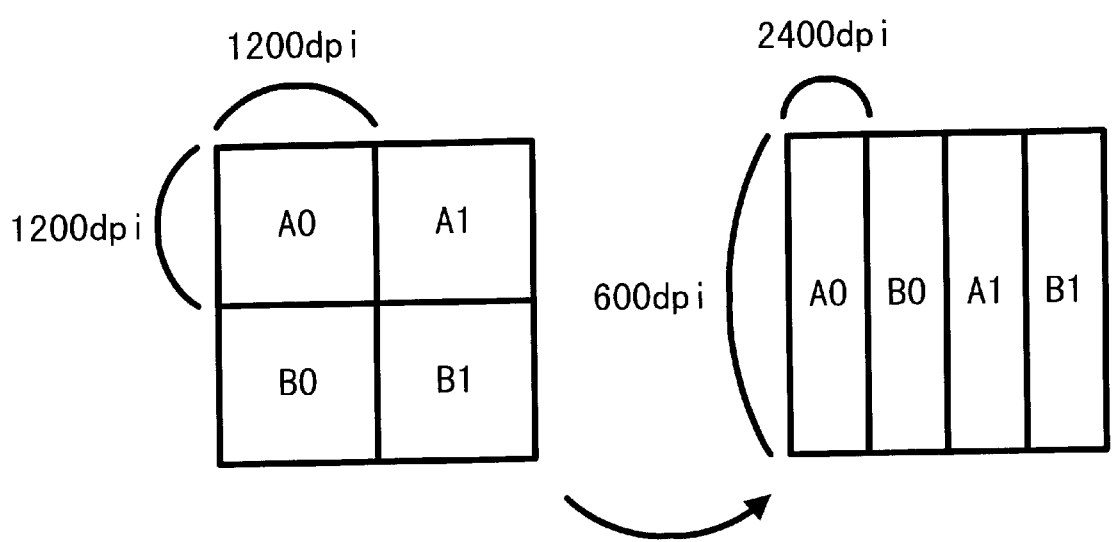
FIG. 9 is a diagram showing an image data rearrangement scheme on the basis of a bit cell composed of 2×2 bits according to the first embodiment.

As a result, as shown in FIG. 9, two consecutive lines of image data with 1200×1200 dpi are rearranged on the basis of a bit cell composed of 2×2 bits, into A0, B0, A1, and B1 in one line, and thus the image data is converted to the one with 2400×600 dpi. Then, the rearranged image data is outputted from the parallel-in serial-out circuit 109.

Figure 10:
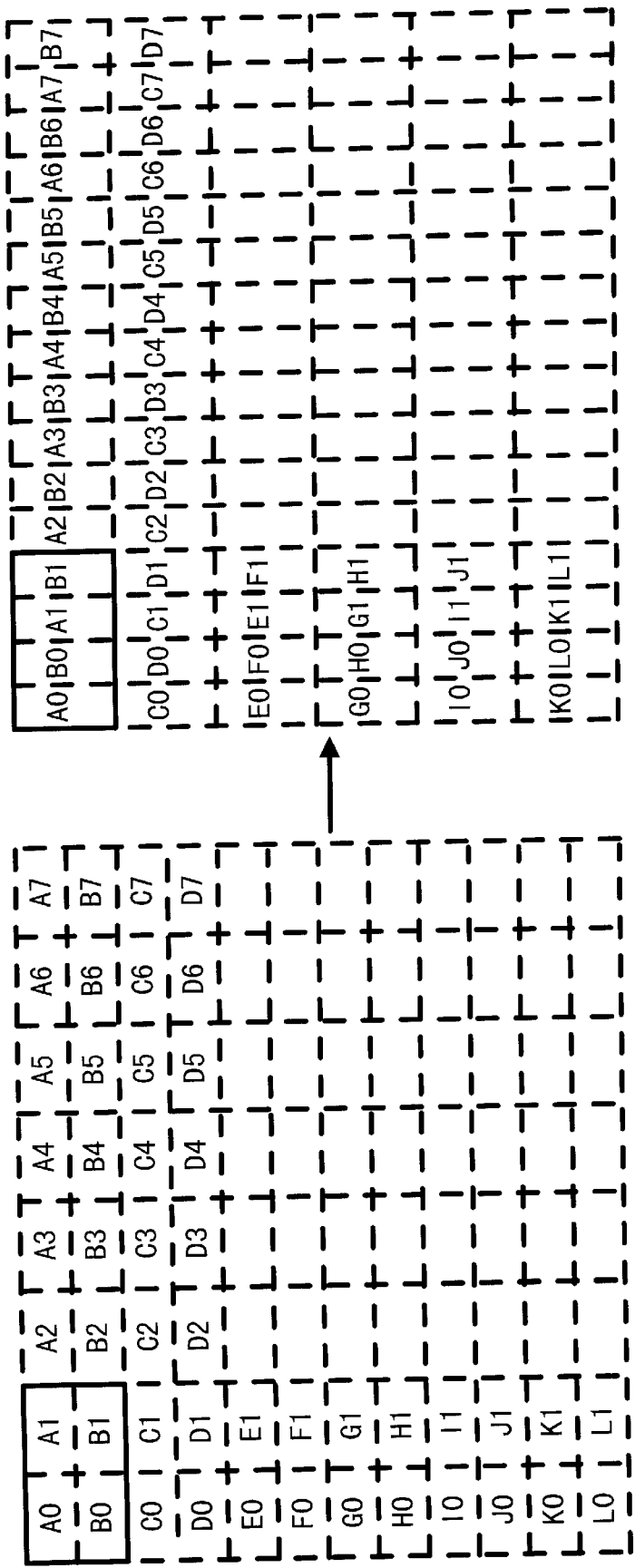
FIG. 10 is a diagram showing an image data rearrangement scheme according to the first embodiment.

FIG. 10 is a conceptual diagram showing the image data with 2400×600 dpi converted from the image data with 1200×1200 dpi. As shown in FIG. 10, in this embodiment, two consecutive lines of image data are retrieved from the image data with 1200×1200 dpi, rearranged alternately in the sequence of RAM1, RAM2, RAM1, RAM2 . . . , in one-and-the-same line, and converted to the image data with 2400×600 dpi.

The resultant image data with 2400×600 dpi is outputted from the image data conversion circuit 60. Then, the DC controller circuit 58 controls the laser beam in the scanning direction by modulating video signals in pulse width such that a static latent image corresponding to 2400 dpi is formed on the photoconductive drum 21. In the sub-scanning direction, printing is performed by transporting the recording paper P at a speed corresponding to 600 dpi.

Figure 11:
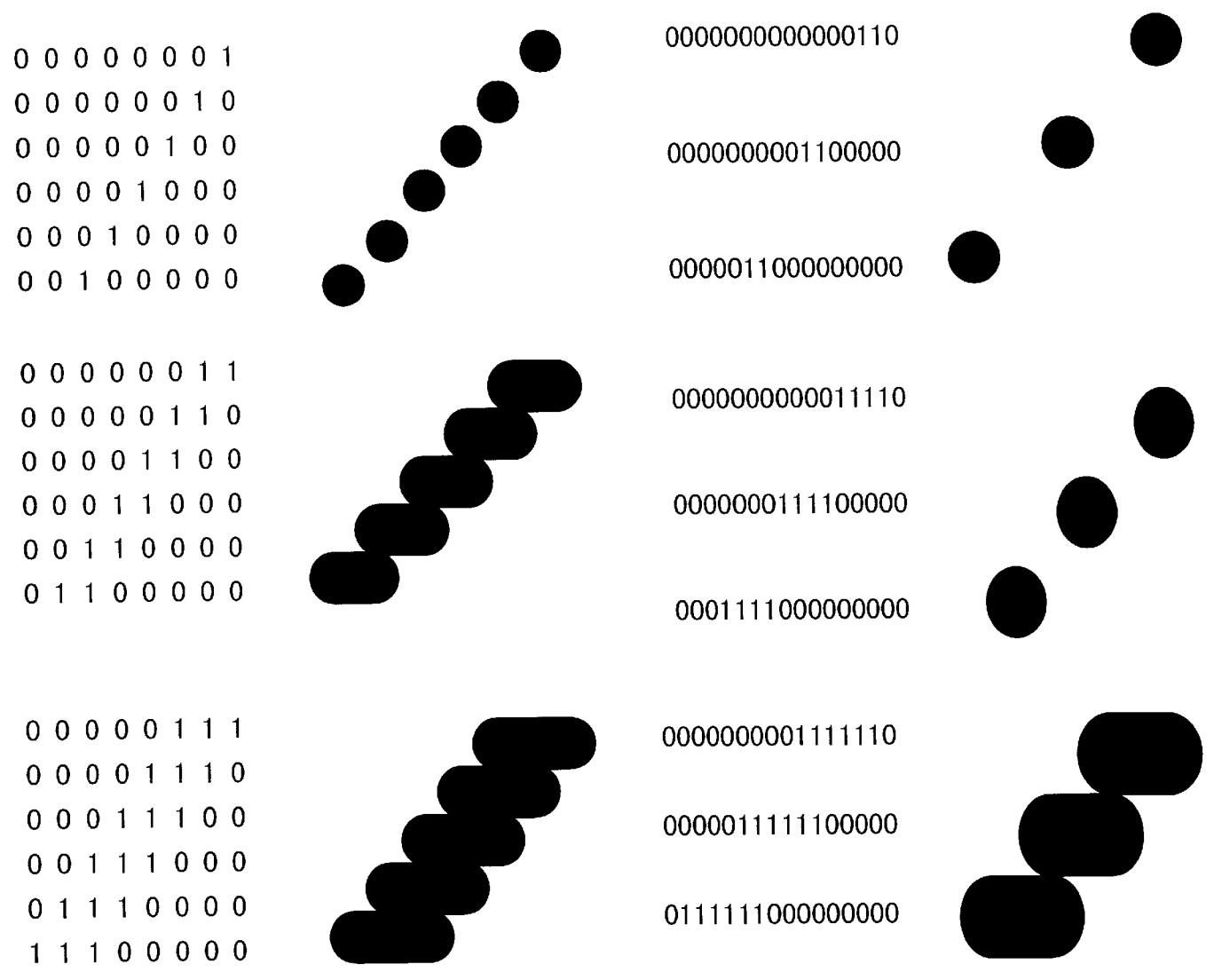

FIG. 11 shows a comparison of printing results. Shown on the left side are cases where printing is performed using image data with 1200×1200 dpi, and shown on the right side are cases where printing is performed using image data with 2400×600 dpi. As the printing results are shown in enlarged scale in FIG. 11, the results printed using image data with 2400×600 dpi appear rougher than those using image data with 1200×1200 dpi. However, both of the printing results are perceived substantially the same by the human eye and, particularly, perceived indistinctively in terms of gray-scale representation.

When the Normal signal inputted to the selector 107 is 1, 32-bit data is read from the RAM1 at a time in synchronism with the latch signals and transmitted to the parallel-in serial-out circuit 109, and then printing is executed at a resolution of 600×600 dpi. In this case, print data transmitted from the personal computer or the like is developed into image data with 600×600 dpi, which is the intrinsic resolution of the laser printer, instead of being developed into image data with 1200×1200 dpi. Then, the image data is transmitted, line by line, by DMA only to the RAM1. In addition, the clock pulses are frequency-divided suitably for 600 dpi.

In the above-described embodiment, the laser printer, which normally performs printing at a resolution of 600×600 dpi, can produce fine printouts perceived to be equivalent to those printed by a laser printer with a resolution of 1200×1200 dpi. As described above, print data is first developed into image data with a high resolution of 1200×1200 dpi, and then converted to image data with 2400×600 dpi by rearrangement of dot data in blocks of two consecutive lines, on the basis of a bit cell composed of 2×2 bits. Finally, printing is executed while the laser beam is modulated in pulse width. Particularly, the printouts are comparable, in gray-scale representation, to those produced by the laser printer with 1200×1200 dpi.

Figure 12:
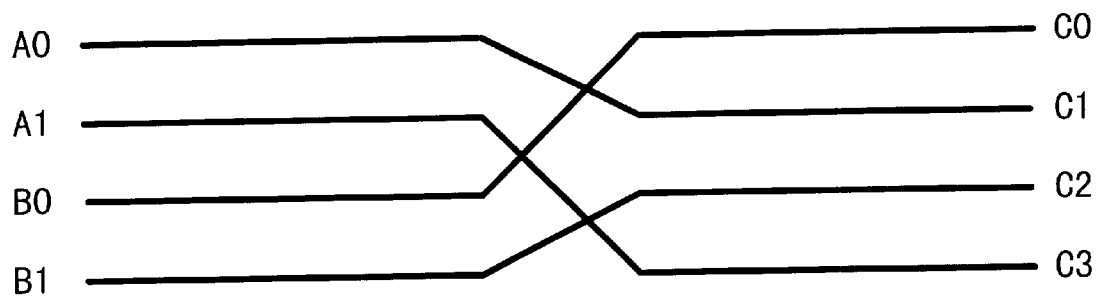
FIG. 12 is a connection diagram showing a selector circuit according to a second embodiment.

A second embodiment of the invention will now be described. The second embodiment differs from the first embodiment only in the rearrangement scheme. Instead of the rearrangement scheme of the first embodiment under which C0=A0, C1=B0, C2=A1, and C3=B1, another rearrangement scheme under which C0=B0, C1=A0, C2=B1, and C3=A1 is adopted in the second embodiment. To execute this rearrangement scheme, connections in the internal circuit of the selector 107 should be arranged as shown in FIG. 12. As a result, dot data in two consecutive lines are rearranged in the sequence of RAM2, RAM1, RAM2, RAM1 . . . , which is reverse to the rearrangement order of the first embodiment, and the image data with 1200×1200 dpi is converted to the one with 2400×600 dpi.

Figure 13:
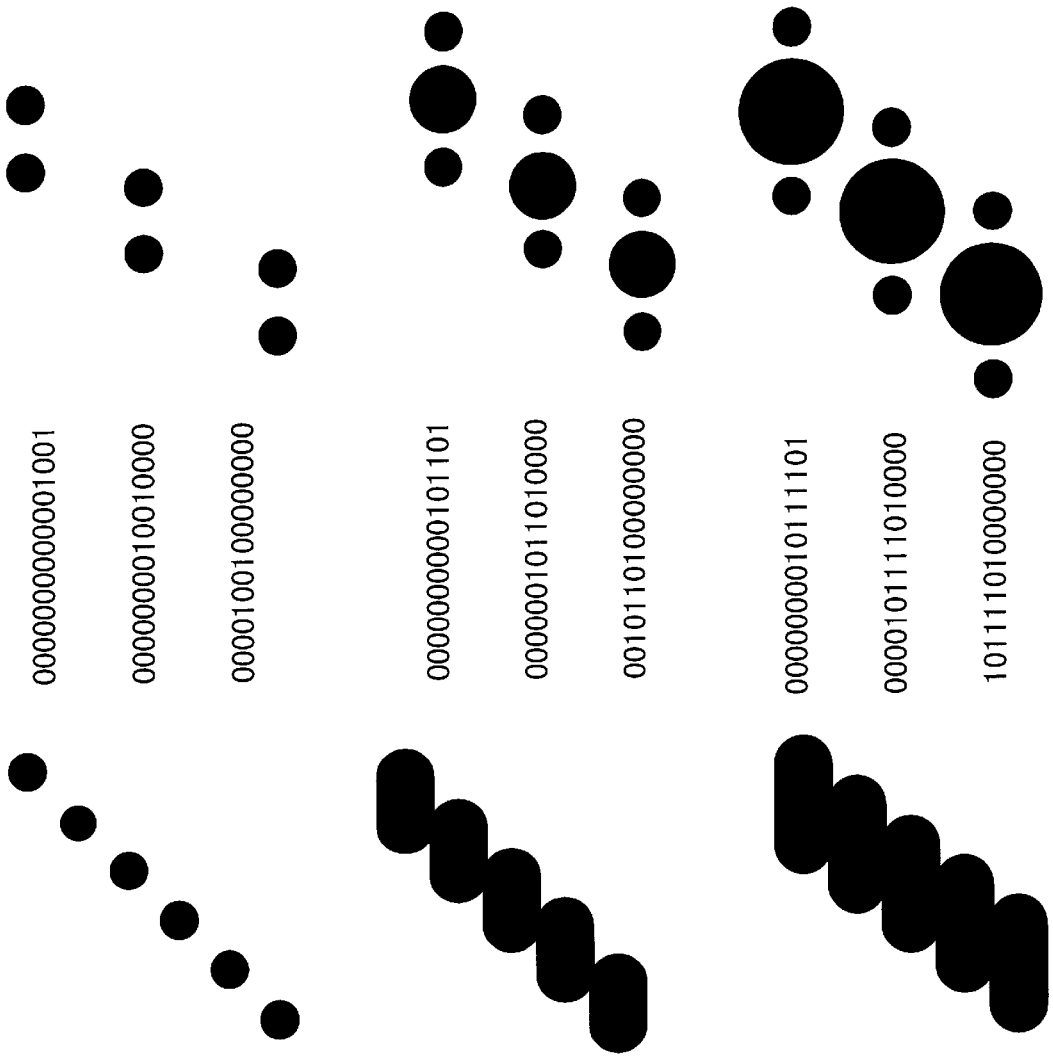
FIG. 13 is a diagram showing a comparison between the printing results according to the second embodiment and those produced by a high-resolution printer.

The printing results obtained by such rearrangement is shown in FIG. 13 in comparison with the results printed by a laser printer with 1200×1200 dpi. Shown on the left side are cases where printing is performed by a laser printer with 1200×1200 dpi. Shown on the right side are cases where printing is performed by the laser printer 1 with 600×600 dpi by converting image data to 2400×600 dpi and forming a static latent image while the laser beam is modulated in pulse width. As the printing results are shown in enlarged scale in FIG. 13, the results printed using image data converted to 2400×600 dpi appear rougher than the results printed by the laser printer with 1200×1200 dpi. However, actual printing results in both cases are perceived indistinctively by the human eye and, particularly, perceived substantially the same in terms of gray-scale representation.

Figure 14:
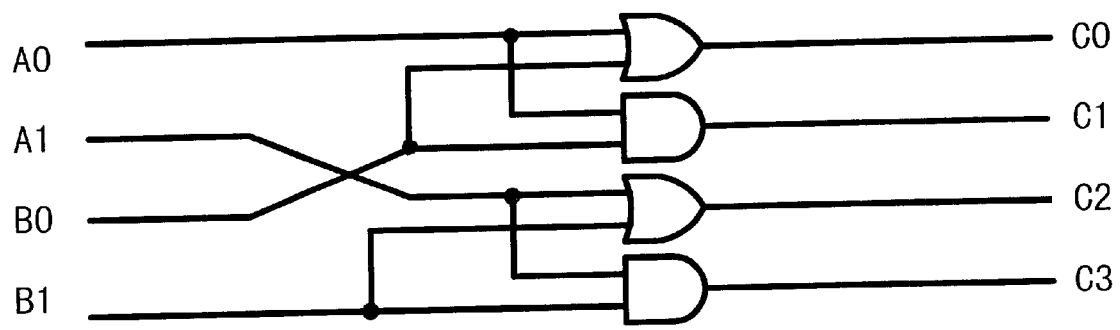
FIG. 14 is a connection diagram showing a selector circuit according to a third embodiment.

A third embodiment of the invention will now be described. The third embodiment differs from the first and second embodiments in the rearrangement scheme. According to a rearrangement scheme of the third embodiment, when a bit cell composed of 2×2 bits contains a dot of an image to be printed as any one of dots rearranged in one-and-the-same line, that dot is rearranged to be disposed at the first (leftmost) bit position of a new bit cell. The internal circuit of the selector 107 is structured as shown in FIG. 14. More specifically, it is arranged that A0 and B0 are inputted to a common OR or AND circuit, while A1 and B1 are inputted to a common OR or AND circuit. As a result, when either A0 or B0 is a dot of an image to be printed, a dot pattern is outputted to indicate that A0 or B0 is printed as C0 disposed at the first (leftmost) bit position of the new bit cell. When either A1 or B1 is a dot of an image to be printed, a dot pattern is outputted to indicate that A1 or B1 is printed as C2 disposed at the third bit position of the new bit cell. Consequently, when this rearrangement scheme is adopted, boundaries of an image obtained by image data converted to 2400×600 dpi will accurately agree with boundaries of an image obtained by image data developed into 1200×1200 dpi.

Figure 15:
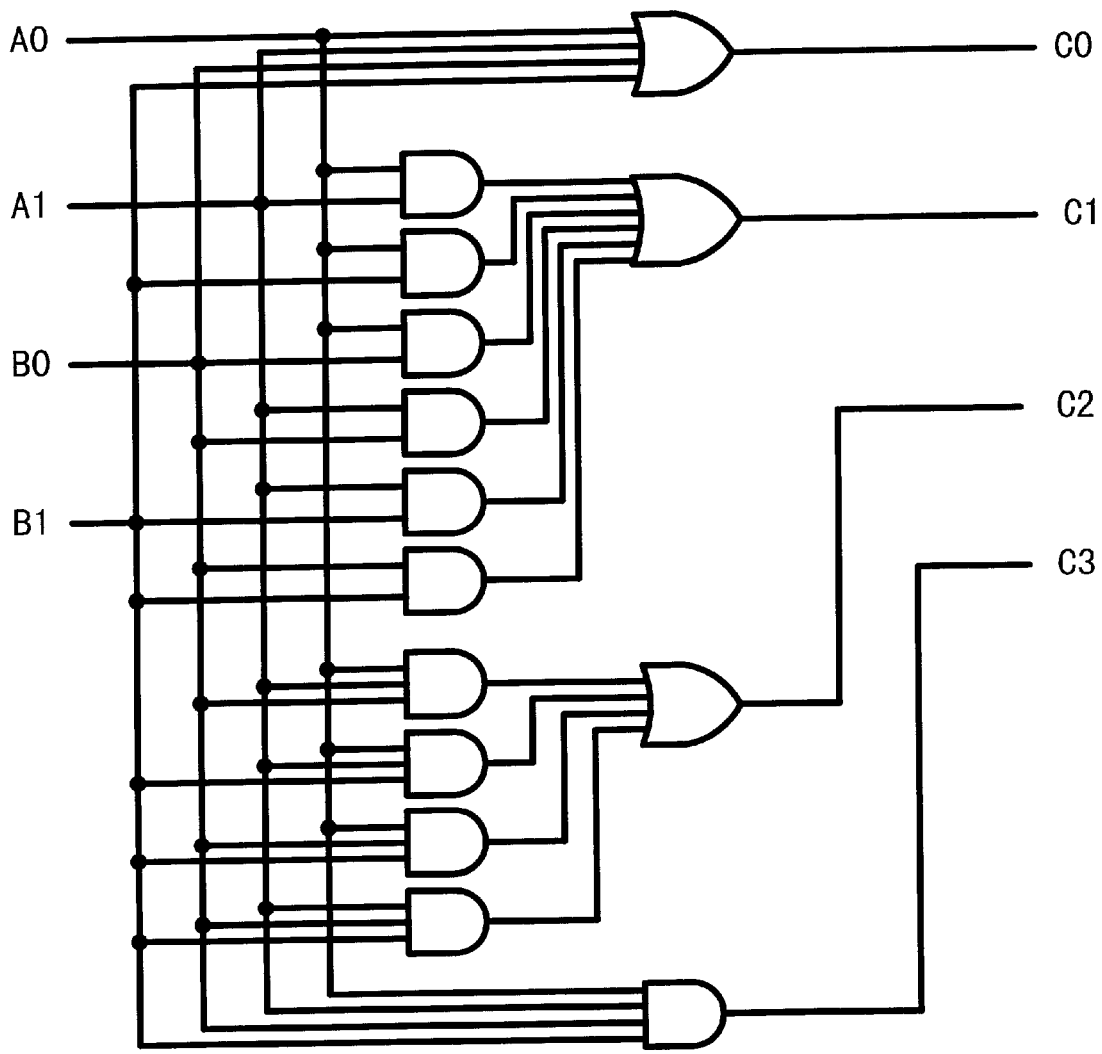
FIG. 15 is a connection diagram showing a selector circuit according to a fourth embodiment.

A fourth embodiment of the invention will now be described. Still another rearrangement scheme is adopted in the fourth embodiment, and, according to the rearrangement scheme, when any dot within a bit cell composed of 2×2 bits is a dot of an image to be printed, that dot is rearranged to be always disposed at the first (leftmost) bit position of a new bit cell. The internal circuit of the selector 107 is structured as shown in FIG. 15. More specifically, the logic circuit is structured so as to obtain the following relationship:

C0=A0 or A1 or B0 or B1;

C1=(A0 and A1) or (A0 and B0) or (A0 and B1) or (A1 and B0) or (A1 and B1) or (B0 and B1);

C2=(A0 and A1 and B0) or (A0 and A1 and B1) or (A0 and B0 and B1) or (A1 and B0 and B1); and C3=A0 and A1 and B0 and B1.

As a result, if a dot to be printed is rearranged to be always disposed at the first (leftmost) bit position of the new bit cell, and boundaries of an image obtained by image data converted to 2400×600 dpi will closely correspond to boundaries of an image obtained by image data developed into 1200×1200 dpi.

Although, in the logic circuits of the above-described first to fourth embodiments, a dot is reproduced at the first (leftmost) bit position of the new bit cell, a dot may be reproduced at any other predetermined bit position. In such a logic circuit, the same effect as obtained in the above-described circuits can be obtained.

Figure 16:
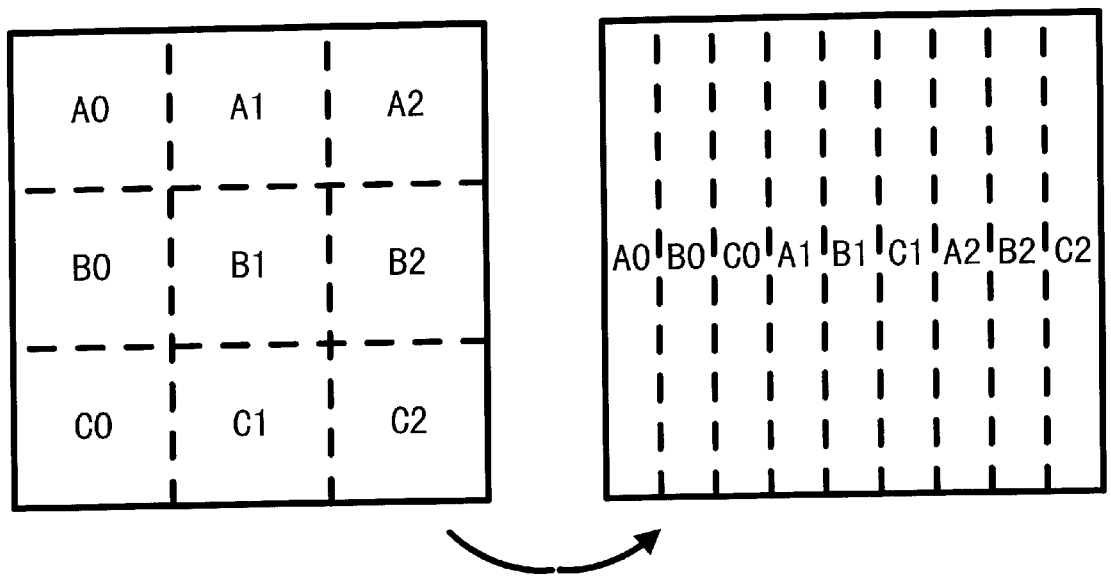
FIG. 16 is a diagram showing an image data rearrangement scheme on the basis of a bit cell composed of 3×3 bits according to a fifth embodiment.
Figure 17:
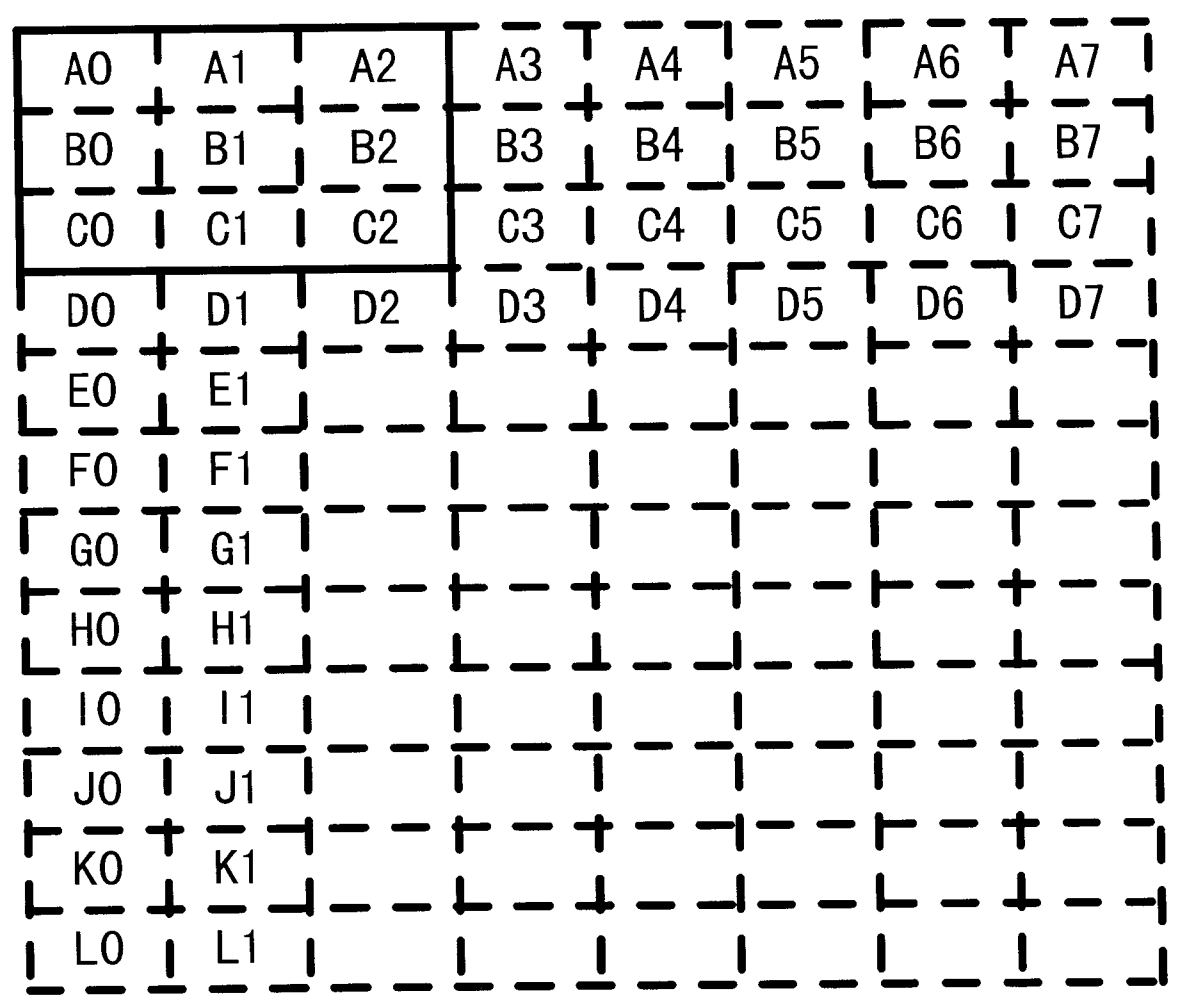
Figure 18:
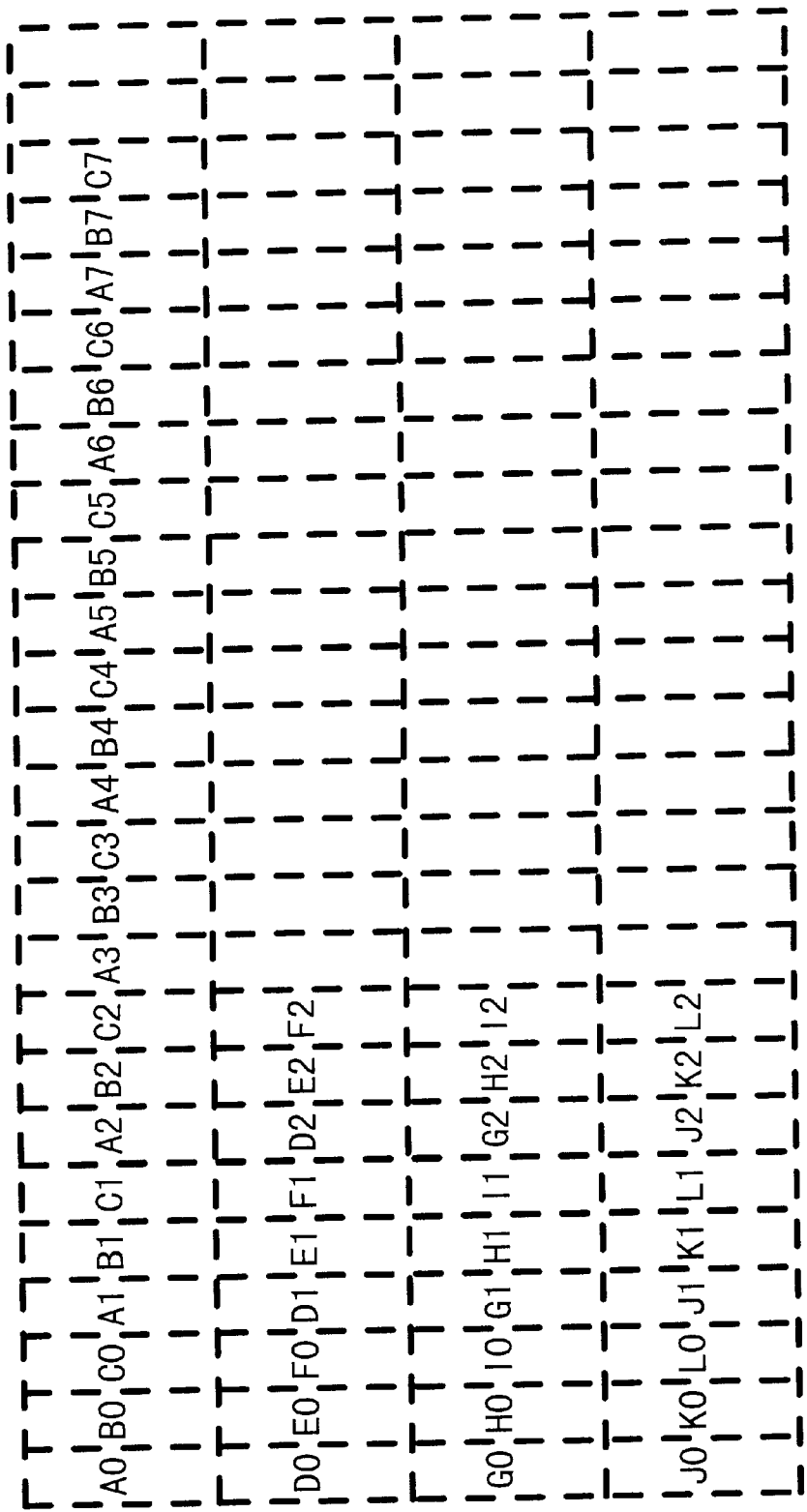
FIG. 18 is a diagram showing an image data rearrangement scheme according to the fifth embodiment.

In the first to fourth embodiments, the image data developed into 1200×1200 dpi is rearranged in blocks of two consecutive lines, on the basis of a bit cell composed of 2×2=4 bits. In a fifth embodiment of the invention, as shown in FIG. 16, the image data is rearranged in blocks of three consecutive lines, on the basis of a bit cell composed of 3×3=9 bits. At this time, the video clock generating circuit 56 should be adapted to attain a frequency corresponding to a resolution that is nine times 600 dpi. In this case, image data with 1800×1800 dpi as shown in FIG. 17 is rearranged into image data as shown in FIG. 18. Then, printing is accomplished by formation of a static latent image with a resolution equivalent to 5400 dpi while the laser beam is modulated in pulse width in the scanning direction, and by transport of printing paper P at a speed corresponding to 600 dpi in the sub-scanning direction. Similarly to the case where rearrangement is made in blocks of two consecutive lines, resultant printouts are perceived to be indistinct from and comparable, in gray-scale quality, to those obtained by a laser printer capable of printing at a resolution of 1800× 1800 dpi. When 5400 dpi is not required in the scanning direction, the video clock generating circuit 56 attaining a high frequency may be eliminated, if bit skipping is additionally performed in the scanning direction. In this case, image reproducibility will deteriorate in some degree.

While the invention has been described in respect of the preferred embodiments, it will be understood that it is not intended to limit the invention to these embodiments and that various changes may be made therein to embody the invention without departing from the spirit of the invention.

Although, in the above-described embodiments, image data is rearranged by the hardware logic circuit of the selector 107, it may be rearranged using a pattern conversion table.

Although, in the above-described embodiments, image data is rearranged in blocks of two or three consecutive lines, in an isotropic manner, and on the basis of a bit cell composed of 2×2=4 bits or 3×3=9 bits, image data may be rearranged in blocks of two consecutive lines, on the basis of a bit cell composed of 2 or 6 bits.

Although, in the above-described embodiments, the invention is applied to the laser printer, it may be applied to an ink jet printer or a line thermal printer. In such cases, a factor causing a reduction in resolution might lie in the carriage moving direction or the paper feed direction in the ink jet printer, while such a factor might lie in the line direction in the line thermal printer. Thus, although, in the embodiments, image data is rearranged such that its resolution in the sub-scanning direction, that is, the paper feed direction agrees with the resolution of the printer, image data may be rearranged such that its resolution in the scanning direction agrees with the resolution of the printer.

What is claimed is:

1. A printing system, comprising:
  a memory device that stores image data;
  a first developer that develops print data into first image data having a first resolution in two crosswise directions, the first image data being stored in the memory device;

a rearranger that breaks the first image data stored in the memory device into blocks of N consecutive lines, N being not smaller than two, and retrieves therefrom the first image data in blocks of N consecutive lines to rearrange N lines of retrieved image data into one line of image data according to a predetermined rearrangement scheme;

a printing device that prints at a second resolution lower than the first resolution;

a first printing controller that controls the printing device to execute printing based on the image data rearranged by the rearranger;

a second developer that develops print data into second image data having the second resolution in two crosswise directions, the second image data being stored in the memory device;

a second printing controller that controls the printing device to execute printing based on the second image data stored in the memory device; and a switching device that switches between the first developer and the second developer prior to development of print data.

2. The printing system according to claim 1, further comprising a mode determiner that determines which mode is designated as a print mode, a fine mode in which printing is executed at the first resolution or a normal mode in which printing is executed at the second resolution, wherein the switching device switches to the first developer when the mode determiner determines that the fine mode is designated, and switches to the second developer when the normal mode is designated.

3. The printing system according to claim 1, further comprising a memory amount determiner that determines whether an amount of memory of the memory device is sufficient to store print data as the first image data, wherein the switching device switches to the first developer when the memory amount determiner determines that the amount of memory is sufficient, and switches to the second developer when the memory amount determiner determines that the amount of memory is insufficient.

4. The printing system according to claim 1, wherein the printing device has the second resolution as a resolution in a sub-scanning direction in which a printing medium is transported and a third resolution, which is higher than the first resolution, as a resolution in a scanning direction perpendicular to the sub-scanning direction.

5. The printing system according to claim 4, wherein the first resolution is N times the second resolution, and the third resolution is N times the first resolution.

6. The printing system according to claim 1, wherein the printing device comprises a print engine for a laser printer, and the first printing controller controls the print engine to perform pulse width modulation of a laser beam that is moved in the scanning direction when the printing device executes printing of the one line of image data rearranged by the rearranger.

7. The printing system according to claim 1, wherein the rearranger comprises:

an N-line memory device having a plurality of memory areas for storing the N lines of retrieved image data line by line; and a selector that receives the image data on the basis of one bit, line by line, from the plurality of memory areas, rearranges the image data by means of an internal hardware logic circuit, and outputs the rearranged image data.

8. The printing system according to claim 1, wherein according to the rearrangement scheme, image data located at same bit positions in respective lines of the N lines is repeatedly processed into a bit cell composed of M bits (M being a multiple of N) until the one line of image data is created, the same bit positions in the respective lines corresponding, in a fixed relationship, to bit positions in the respective bit cells.

9. A printing system, comprising:

a memory device that stores image data;

a first developer that develops print data into first image data having a first resolution in two crosswise directions, the first image data being stored in the memory device;

a rearranger that breaks the first image data stored in the memory device into blocks of N consecutive lines, N being not smaller than two, and retrieves therefrom the first image data in blocks of N consecutive lines to rearrange N lines of retrieved image data into one line of image data according to a predetermined rearrangement scheme;

a printing device that prints at a second resolution lower than the first resolution; and a printing controller that controls the printing device to execute printing based on the image data rearranged by the rearranger, wherein according to the rearrangement scheme, image data located at a bit position of a bit cell comprising M bits and N lines in respective lines is repeatedly processed into a bit cell composed of M×N bits until the one line of image data is created, and when a bit of image data to be outputted exists at any one of M bit positions in the respective lines, the bit of image data is disposed in a predetermined bit position in a corresponding bit cell.

10. The printing system according to claim 9, wherein the printing device has the second resolution as a resolution in a sub-scanning direction in which a printing medium is transported and a third resolution, which is higher than the first resolution, as a resolution in a scanning direction perpendicular to the sub-scanning direction.

11. The printing system according to claim 10, wherein the first resolution is N times the second resolution, and the third resolution is N times the first resolution.

12. The printing system according to claim 9, wherein the printing device comprises a print engine for a laser printer, and the first printing controller controls the print engine to perform pulse width modulation of a laser beam that is moved in the scanning direction when the printing device executes printing of the one line of image data rearranged by the rearranger.

13. The printing system according to claim 9, wherein the rearranger comprises:

an N-line memory device having a plurality of memory areas for storing the N lines of retrieved image data line by line; and a selector that receives the image data on the basis of one bit, line by line, from the plurality of memory areas, rearranges the image data by means of an internal hardware logic circuit, and outputs the rearranged image data.

14. A printing system, comprising:

a memory device that stores image data;

a first developer that develops print data into first image data having a first resolution in two crosswise directions, the first image data being stored in the memory device;

a rearranger that breaks the first image data stored in the memory device into blocks of N consecutive lines, N being not smaller than two, and retrieves therefrom the first image data in blocks of N consecutive lines to rearrange N lines of retrieved image data into one line of image data according to a predetermined rearrangement scheme;

a printing device that prints at a second resolution lower than the first resolution; and a printing controller that controls the printing device to execute printing based on image data rearranged by the rearranger, wherein according to the rearrangement scheme, image data located at a bit position of a bit cell comprising M bits and N lines in respective lines is repeatedly processed into a bit cell composed of M×N bits in one line until the one line of image data is created, and when a bit of image data to be outputted exists at any one of the bit positions in the M by N bit cell, the bit of image data is disposed in a predetermined bit position in a corresponding one line bit cell.

15. A printing method, comprising the steps of:

developing print data into first image data having a first resolution in two crosswise directions and storing the developed first image data in a memory device;

breaking the first image data stored in the memory device into blocks of N consecutive lines, N being not smaller than two, and retrieving therefrom the first image data in blocks of N consecutive lines to rearrange N lines of retrieved image data into one line of image data according to a predetermined rearrangement scheme;

actuating a printing device, which performs printing at a second resolution lower than the first resolution, to execute printing based on the rearranged image data;

developing print data into second image data having the second resolution lower than the first resolution in two crosswise directions and storing the second image data in the memory device;

actuating the printing device to execute printing based on the second image data stored in the memory device; and switching between storing the first image data in the memory device and storing the second image data in the memory device.

16. A printing method, comprising the steps of:

developing print data into first image data having a first resolution in two crosswise directions and storing the developed first image data in a memory device;

breaking the first image data stored in the memory device into blocks of N consecutive lines, N being not smaller than two, and retrieving therefrom the first image data in blocks of N consecutive lines to rearrange N lines of retrieved image data into one line of image data according to a predetermined rearrangement scheme; and actuating a printing device, which performs printing at a second resolution lower than the first resolution, to execute printing based on the rearranged image data, wherein according to the rearrangement scheme, image data located at same bit positions in respective lines of the N lines is repeatedly processed into a bit cell composed of M bits (M being a multiple of N) until the one line of image data is created, and when a bit of image data to be outputted exists at any one of the same bit positions in the respective lines, the bit of image data is disposed in a predetermined bit position in a corresponding bit cell.

17. A printing method, comprising the steps of:

developing print data into first image data having a first resolution in two crosswise directions and storing the developed first image data in a memory device;

breaking the first image data stored in the memory device into blocks of N consecutive lines, N being not smaller than two, and retrieving therefrom the first image data in blocks of N consecutive lines to rearrange N lines of retrieved image data into one line of image data according to a predetermined rearrangement scheme; and actuating a printing device, which performs printing at a second resolution lower than the first resolution, to execute printing based on rearranged image data, wherein according to the rearrangement scheme, image data located at same bit positions in respective lines of the N lines is repeatedly processed into a bit cell composed of M bits (M being a multiple of N) until the one line of image data is created, and when a bit of image data to be outputted exists at any one of the bit positions in the N lines, the bit of image data is disposed in a predetermined bit position in a corresponding bit cell.

\* \* \* \* \*